(12) United States Patent
Muto

(10) Patent No.: US 8,595,392 B2
(45) Date of Patent: Nov. 26, 2013

(54) USB DEVICE CONTROLLER AND POWER CONTROL METHOD THEREOF

(75) Inventor: Kiichi Muto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/543,391

(22) Filed: Jul. 6, 2012

(65) Prior Publication Data

US 2013/0013825 A1    Jan. 10, 2013

(30) Foreign Application Priority Data

Jul. 7, 2011    (JP) ................................. 2011-150562

(51) Int. Cl.
*G06F 13/38*    (2006.01)

(52) U.S. Cl.
USPC .................... 710/52; 710/29; 710/33; 710/72

(58) Field of Classification Search
None
See application file for complete search history.

(56) References Cited

U.S. PATENT DOCUMENTS

| | | | |
|---|---|---|---|
| 7,237,131 B2* | 6/2007 | Kwa et al. ..................... | 713/323 |
| 7,243,243 B2* | 7/2007 | Gedeon ......................... | 713/300 |
| 7,596,643 B2* | 9/2009 | Merry et al. .................... | 710/56 |
| 8,112,646 B2* | 2/2012 | Tsai .............................. | 713/320 |
| 2011/0264934 A1* | 10/2011 | Branover et al. ............. | 713/320 |

FOREIGN PATENT DOCUMENTS

| | | |
|---|---|---|
| JP | 11-205412 A | 7/1999 |
| JP | 2005-260638 A | 9/2005 |

* cited by examiner

*Primary Examiner* — Cheng-Yuan Tseng

(74) *Attorney, Agent, or Firm* — Sughrue Mion, PLLC

(57) ABSTRACT

A device controller, a peripheral device, and a power control method that enable buffers to be used efficiently and that enable power control to be performed on the basis of data amounts accumulated in the buffers are provided. A novel device controller includes an input buffer for accumulating data output from a host device, an output buffer for accumulating data output to the host device, a data communication section for transferring data between the input and output buffers and the host device, and a data buffer control section for modifying buffer allocation amounts to the input and output buffers on the basis of the data amount accumulated in at least one of the input and output buffers. The data buffer control section causes the data communication section to transition from a normal power consumption mode to a low power consumption mode when the data amount reaches a predetermined value.

21 Claims, 9 Drawing Sheets

USB DEVICE CONTROLLER AND POWER CONTROL METHOD THEREOF

CROSS-REFERENCE TO RELATED APPLICATIONS

The disclosure of Japanese Patent Application No. 2011-150562 filed on Jul. 7, 2011 including the specification, drawings and abstract is incorporated herein by reference in its entirety.

BACKGROUND

The present invention relates to a device controller with power control function, a USB device controller with power control function, and a power control method.

The USB (Universal Serial Bus) standard is typically used to couple various peripheral devices to a computer device that serves as a host device. In order to perform communication on the basis of the USB standard, a host device needs to include a USB host controller while a peripheral device coupled to the host device needs to include a USB device controller. With advances in technologies, the USB standard has been enhanced over time. While the USB 2.0 standard is still the most popular USB standard version used in the market, the USB 3.0 standard has already been developed, and USB 3.0 standard based products are expected to become popular in the market in the near future.

A typical configuration of a USB device controller based on the USB 2.0 standard is shown in FIG. 8. A USB device controller 121 based on the USB 2.0 standard includes a protocol control section 122 and a data buffer 123. The USB device controller 121 receives data from a USB host controller 111 included in a host device, and processes the data using the protocol control section 122. The protocol control section 122 performs data demodulation, header analysis, etc. The processed data is temporarily stored in the data buffer 123, and is then output to a subsequent stage circuit 124, such as a storage device for storing data.

The USB 3.0 standard enables the data buffer to be modified depending on the packet size. Specifically, as shown in FIG. 9, the buffer size allocated to each endpoint (EP) can be modified. An endpoint serves as a control section for a data transfer buffer, and can define the transfer direction, the transfer method, etc. for the buffer allocated to the endpoint. The transfer directions may include OUT transfer in which data is transferred from a host device to a peripheral device and IN transfer in which data is transferred from the peripheral device to the host device. The transfer methods may include bulk transfer, interrupt transfer, etc.

Japanese Unexamined Patent Publication No. 2005-260638 discloses a configuration of a peripheral device based on the USB standard in which a buffer memory is shared by endpoints so as to be allocated to the endpoints. Specifically, this patent reference discloses a configuration in which a buffer memory is shared by a data transmission buffer and a data reception buffer. The patent reference also discloses a process in which the number of packets included in transmission data and the number of packets included in reception data are counted, and the buffer capacity allocated to the data transmission buffer and the buffer capacity allocated to the data reception buffer are modified on the basis of the respective count values.

Furthermore, Japanese Unexamined Patent Publication No. Hei 11(1999)-205412 discloses a low power consumption control method for use in a USB host controller in which the power consumption of the input buffer for receiving data output from a USB peripheral device is reduced when data transfer is not performed via the USB port.

SUMMARY

The buffer memory allocation control method disclosed in the Japanese Unexamined Patent Publication No. 2005-260638 uses statistical values derived from the transmission and reception data to determine the buffer memory allocation capacities. However, the data amounts accumulated in the buffers may vary due to, e.g., the difference between the transfer speed at which data is transferred from the host controller to the peripheral device and the transfer speed at which data is transferred from the buffer to the subsequent stage circuit. For example, if the transfer speed at which data is transferred from the input buffer to the subsequent stage circuit is relatively low, data transferred from the host controller is accumulated in the input buffer. In contrast, if the transfer speed at which data is transferred from the subsequent stage circuit to the output buffer is relatively low, once data having an amount equivalent to one packet is accumulated in the output buffer, the data is immediately transmitted to the host controller, thereby disabling the output buffer from being used efficiently. Using only the numbers of packets included in the transmission and reception data to determine the buffer memory allocation fails to address the above problem, and therefore cannot achieve appropriate buffer memory allocation.

Furthermore, as described above, when the transfer speed from the input buffer to the subsequent stage circuit is relatively low, data is accumulated in the input buffer, thereby disabling the peripheral device from receiving further data from the host controller. However, even in that case, the peripheral device continues its reception operation for receiving data output from the host controller, thus resulting in a problem in that electric power is wasted.

According to one aspect of the present invention, a device controller, includes: an input buffer configured to accumulate received data output from a host device; an output buffer configured to accumulate transmission data for the host device; a data communication section configured to receive the received data from the host device and to transmit the transmission data to the host device; and a buffer control section configured to vary a buffer allocation ratio of the input and the output buffers in response to a data amount accumulated in at least one of the input and the output buffers, in which the buffer control section causes the data communication section to transition from a normal power consumption mode to a low power consumption mode or from the low power consumption mode to the normal power consumption mode when the data amount reaches a predetermined value.

Using such a device controller enables not only the buffer allocation amounts to the input buffer and the output buffer to be modified but also the data communication section to transition from one operation mode to another on the basis of the data amounts accumulated in the buffers. As a result, the buffers can be used efficiently, and the power consumption of the device controller can also be reduced.

According to another aspect of the present invention, an Universal Serial Bus (USB) device controller, includes: a data link section configured to manage a data link with an USB host; a buffer control section including an input buffer configured to buffer received data from the USB host, the buffer control section being configured to request a transition to a low power state to the data link section when a data amount stored in the input buffer exceeds a first threshold value.

Using such a USB device controller enables not only the buffer allocation amounts to the input buffer and the output buffer to be modified but also the data communication section to transition from one operation mode to another on the basis of the data amounts accumulated in the buffers. As a result, the buffers can be used efficiently, and the power consumption of the USB device controller can also be reduced.

According to still another aspect of the present invention, a power control method includes causing a data communication section for transferring data between input and output buffers and a host device to transition from a normal power consumption mode to a low power consumption mode on the basis of the data amount accumulated in at least one of the input buffer for accumulating data output from the host device and the output buffer for accumulating data output to the host device, and modifying the memory capacity allocation amounts to the input buffer and the output buffer on the basis of the data amount accumulated in at least one of the input buffer and the output buffer.

Using such a power control method enables not only the buffer allocation amounts to the input buffer and the output buffer to be modified but also the data communication section to transition from one operation mode to another on the basis of the data amounts accumulated in the buffers. As a result, the buffers can be used efficiently, and the power consumption of the device controller and the peripheral device can also be reduced.

According to the aspects of the present invention, there are provided a device controller, a USB device controller, and a power control method that enable the buffers to be used efficiently and that enable power control to be performed on the basis of the data amounts accumulated in the buffers.

DETAILED DESCRIPTION

First Embodiment

Figure 1:
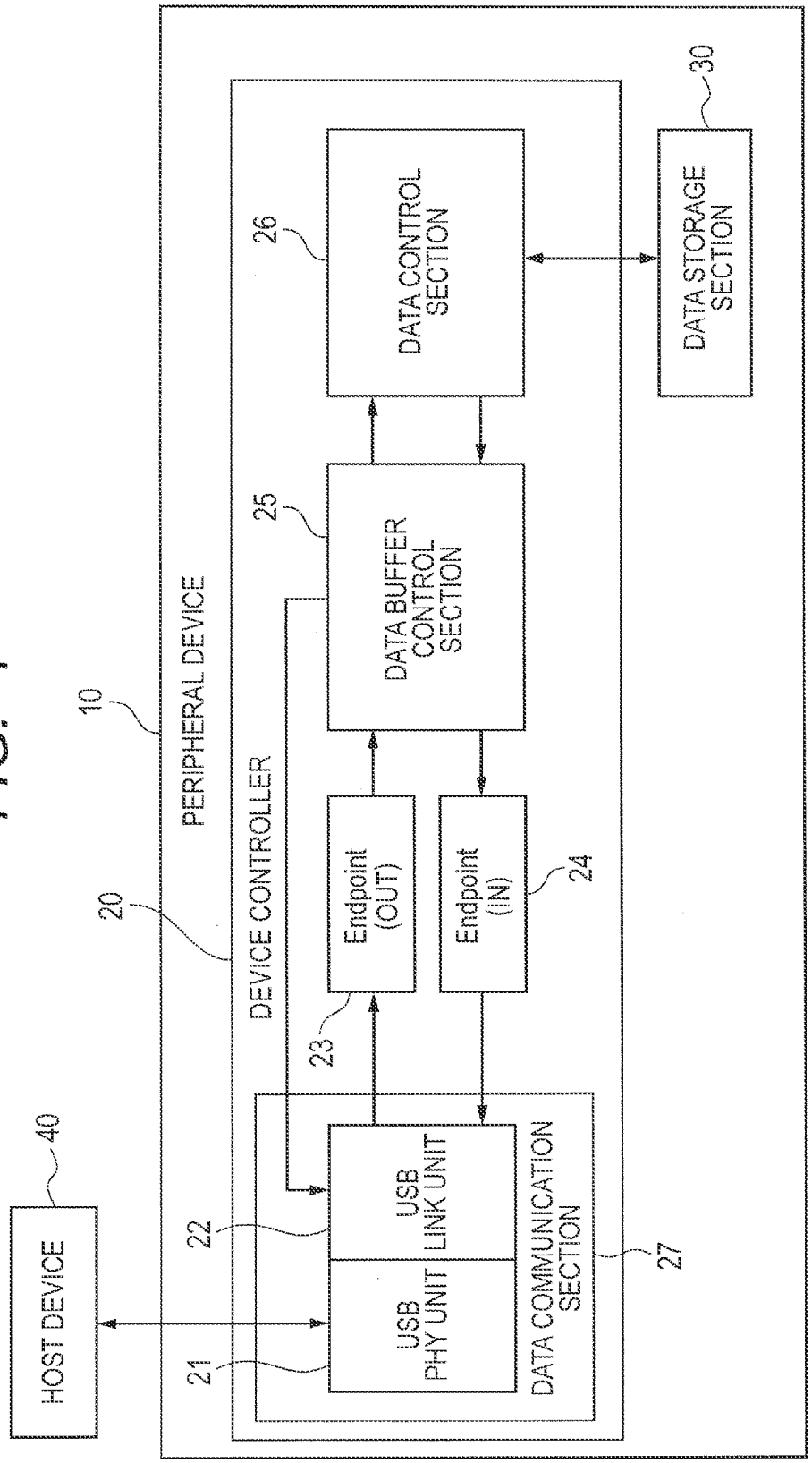
FIG. 1 is a block diagram of a peripheral device according to a first embodiment.

Embodiments of the present invention will now be described with reference to the accompanying drawings. An exemplary configuration of a peripheral device 10 according to a first embodiment of the invention will be described with reference to FIG. 1. The peripheral device 10 includes a device controller 20 and a data storage section 30. The device controller 20 includes a USB PHY unit 21, a USB LINK unit 22, an endpoint (OUT) 23, an endpoint (IN) 24, a data buffer control section 25, and a data control section 26. The device controller 20 performs data input and output to and from the host device 40, and also performs data input and output to and from the data storage section 30. The USB PHY unit 21 and the USB LINK unit 22 are included in a data communication section 27.

The host device 40 may be an information processing device, such as a personal computer (PC) including a USB host controller. Alternatively, the host device 40 may be an information reproduction device that reproduces information recorded on an optical disk, such as a DVD medium, for example.

The peripheral device 10 may be a peripheral device that is coupled to the host device 40 and that performs data transfer on the basis of the USB standard. Alternatively, the peripheral device 10 may be a storage device for storing data, or it may be a printer, a keyboard, etc. to be coupled to the host device 40, for example. The peripheral device 10 may be coupled to the host device 40 either wirelessly or wiredly using a USB bus.

Next, components of the device controller 20 will be described. The USB PHY unit 21 performs data transfer to and from the host device 40. When data is transferred from the device controller 20 to the host device 40, the USB PHY unit 21 performs 8b/10b modulation, converts the parallel data into serial data, and outputs the serial data to the host device 40 via the USB bus, for example. Conversely, when data is transferred from the host device 40 to the device controller 20, the USB PHY unit 21 converts the serial data into parallel data and performs 8b/10b demodulation to extract received data. The USB PHY unit 21 performs data transfer to and from the host device 40 via a USB connector or the like.

The USB LINK unit 22 performs link control required to perform data transfer to and from the host device 40. For example, the USB LINK unit 22 detects errors in data transferred to and from the host device 40. Furthermore, the USB LINK unit 22 has a power control function; power consumption can be reduced when data transfer to and from the host device 40 is not performed, for example.

The endpoint (OUT) 23 receives data from the host device 40 and outputs the data to the data buffer control section 25 when data transfer from the host device 40 to the peripheral device 10 (i.e., OUT transfer) is performed. Conversely, the endpoint (IN) 24 transfers data stored in the data buffer control section 25 to the host device 40 via the USB LINK unit 22 and the USB PHY unit 21 when data transfer from the peripheral device 10 to the host device 40 (i.e., IN transfer) is performed. A memory area on a buffer memory included in the data buffer control section 25 is allocated to each endpoint. In FIG. 1, the buffer memory is allocated to the endpoint (OUT) 23 and the endpoint (IN) 24. However, as the device controller 20 may have multiple endpoints, a memory area on the buffer memory may be allocated to each of three or more endpoints.

Figure 2:
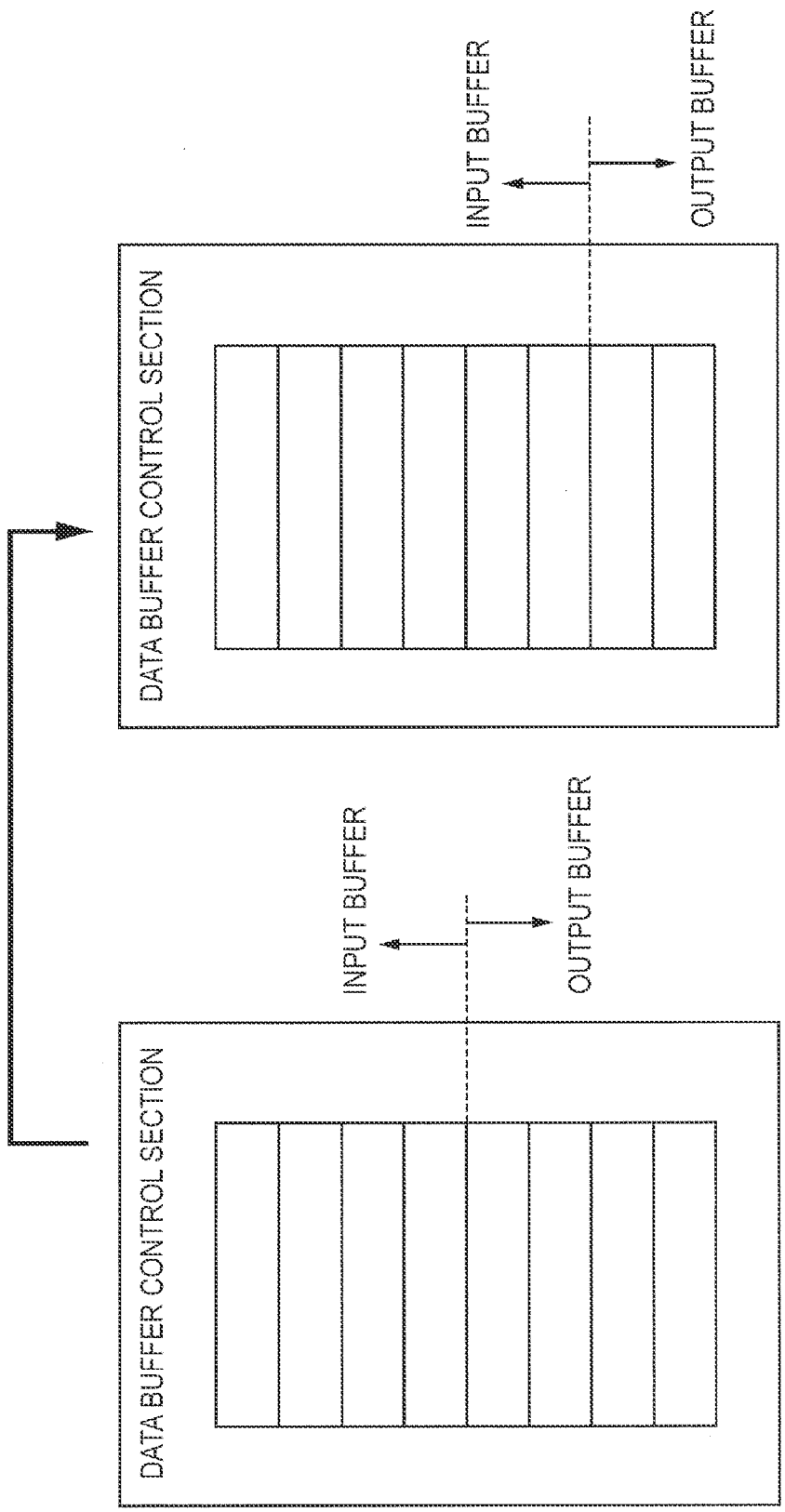
FIG. 2 is a diagram showing the allocation of input and output buffers according to the first embodiment.

The data buffer control section 25 accumulates data that is output from the endpoint (OUT) 23. The data buffer control section 25 also accumulates data that is output to the endpoint (IN) 24. The data buffer control section 25 includes a shared memory. The shared memory includes a memory area allocated to the endpoint (OUT) 23 (hereinafter referred to as an input buffer) and a memory area allocated to the endpoint (IN) 24 (hereinafter referred to as an output buffer). The data buffer control section 25 modifies the memory areas allocated to the input and output buffers on the basis of the data amount accumulated in at least one of the input and output buffers, as shown in FIG. 2.

For example, if the input buffer is completely filled with data, this means that the data transfer speed from the data buffer control section 25 to the data storage section 30 is lower than the data transfer speed from the host device 40 to the data buffer control section 25. In that case, the data buffer control section 25 reassigns part of the memory area allocated to the output buffer to the input buffer so that further data output from the host device 40 can be received as much as possible. The data buffer control section 25 may set a reference value or a threshold value for the data amount accumulated in the input buffer, and may reassign part of the memory area allocated to the output buffer to the input buffer when the accumulated data amount exceeds the reference value or the like. An arbitrary value may serve as the reference value or the threshold value.

If the output buffer remains empty for at least a certain length of time, this also means that the data transfer speed from the data storage section 30 to the data buffer control section 25 is lower than the data transfer speed from the data buffer control section 25 to the host device 40. In that case, the data buffer control section 25 may reassign part of the memory area allocated to the output buffer to the input buffer. The data buffer control section 25 may set a reference value or a threshold value for the data amount accumulated in the output buffer, and may reassign part of the memory area allocated to the output buffer to the input buffer when the accumulated data amount falls below the reference value or the like. An arbitrary value may serve as the reference value or the threshold value.

In addition to the above described input and output buffer allocation control, the data buffer control section 25 also performs power control for the USB LINK unit 22. For example, when the input buffer is completely filled with data, the data buffer control section 25 starts Low Power State control for the USB LINK unit 22 by automatically requesting the USB LINK unit 22 to transition to a low power consumption mode. The data buffer control section 25 may set a reference value or a threshold value for the data amount accumulated in the input buffer, and may request the USB LINK unit 22 to transition to the low power consumption mode when the accumulated data amount exceeds the reference value.

The Low Power State control method is supported by the USB 3.0 standard. According to the Low Power State control method, when data communication to and from the linked device, i.e., the host device 40, is idle, the device controller autonomously reduces its power consumption, thereby enabling electric power to be saved. The Low Power State control method has a mode in which the link remains active and a mode in which the link is suspended, for example. Furthermore, multiple modes may also be set between these two modes so that the power consumption can be reduced in a stepwise manner. The USB 3.0 standard defines four modes: U0 (Link active), U1 (Link idle-fast exit), U2 (Link idle-slower exit), and U3 (Link suspend), for example.

The data buffer control section 25 may automatically request the USB LINK unit 22 to return from the low power consumption mode to a normal power consumption mode when an empty area becomes available in the input buffer. The data buffer control section 25 may set a reference value or a threshold value for the empty area in the input buffer, and may request the USB LINK unit to return from the low power consumption mode to the normal power consumption mode when an empty area equal to or more than the reference value becomes available.

Furthermore, the data buffer control section 25 may request the USB LINK unit 22 to transition to the normal power consumption mode when data is accumulated in the output buffer, and may request to the USB LINK unit 22 to transition to the low power consumption mode when no data is accumulated in the output buffer. When requested to transition to the low power consumption mode, The USB link unit 22 may output a data output suspension signal to the host device 40 for suspension of data output. This enables the USB LINK unit 22 to transition to the low power consumption mode with no data output from the host device 40. As a result, loss of data output from the host device 40 due to the transition of the USB LINK unit 22 to the low power consumption mode can be avoided.

Conversely, when requested to return or transition to the normal power consumption mode, the USB LINK unit 22 may output a data output commencement signal to the host device 40 for commencement of data output. This enables power to be efficiently supplied to the USB LINK unit 22 because the USB LINK unit 22 can transition to the normal power consumption mode when data is output from the host device 40.

The data control section 26 receives data from the input buffer of the data buffer control section 25 and outputs the data to the data storage section 30. The data control section 26 also receives data from the data storage section 30 and outputs the data to the output buffer of the data buffer control section 25.

The data storage section 30 is an exemplary subsequent stage circuit coupled to the device controller 20, and stores data transferred to and from the host device 40. Even while the USB LINK unit 22 is in the low power consumption mode, power is continuously supplied to the data control section 26, the data storage section 30, etc. without interruption so that data can be transferred from the input buffer to the data storage section 30 and from the data storage section 30 to the output buffer.

Next, the OUT transfer operation of the device controller 20 according to the first embodiment of the invention will be described with reference to FIG. 3. First, the endpoint (OUT) 23 receives command (CMD) data from the host device 40. The CMD data contains information, such as the data transfer direction, the number of bytes to be transferred, etc. Then, the endpoint (OUT) 23 receives data units 1 to 4, and accumulates these data units in the input buffer. Because the transfer speed from the data control section 26 to the data storage section 30 is low, no data can be output from the data buffer control section 25 to the data control section 26, resulting in the data units 1 to 4 being accumulated in the input buffer.

Once the data units 1 to 4 are accumulated in the input buffer, the data buffer control section 25 requests the USB LINK unit 22 to transition to the low power consumption mode. In response to this transition request to the low power consumption mode, the USB LINK unit 22 outputs a data output suspension signal to the host device 40. This suspends data output from the host device 40. Thereafter, when the data unit 1 is output to the data control section 26, thus resulting in an empty area becoming available in the input buffer, the data buffer control section 25 requests the USB LINK unit 22 to return to the normal power consumption mode. In response to this return request to the normal power consumption mode, the USB LINK unit 22 outputs a data output commencement signal to the host device 40. This causes a data unit 5 to be output from the host device 40, resulting in the data units 2 to 5 being accumulated in the input buffer.

Figure 3:
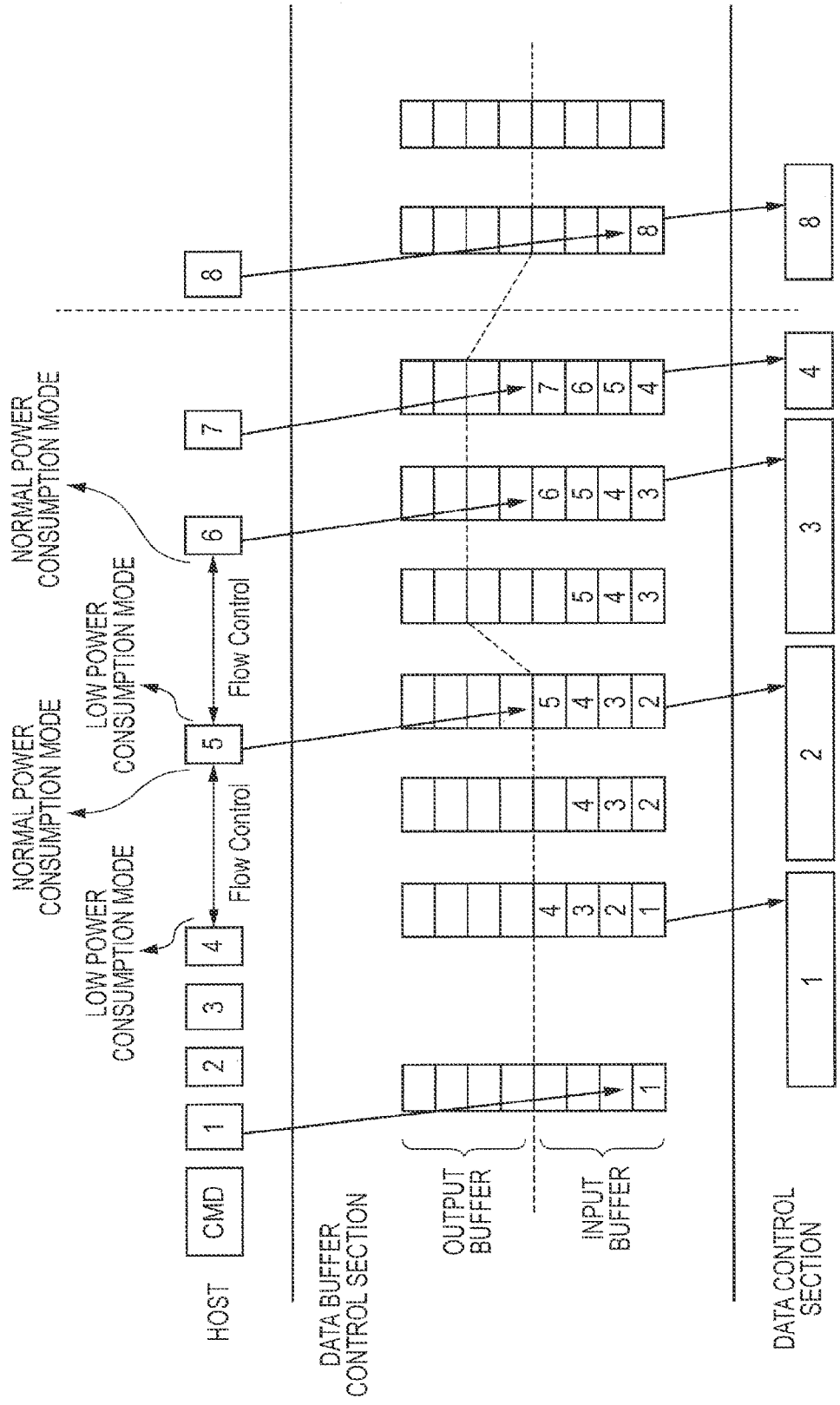
FIG. 3 is a diagram for describing the OUT transfer operation of a device controller according to the first embodiment.

In FIG. 3, the state in which the USB LINK unit 22 operates in the low power consumption mode is denoted as Flow Control. This applies to other figures as well.

Once the data units 2 to 5 are accumulated in the input buffer, the data buffer control section 25 requests the USB LINK unit 22 to transition to the low power consumption mode again. As a result, data output from the host device 40 is suspended. Thereafter, when the data unit 2 is output to the data control section 26, thus resulting in an empty area becoming available in the input buffer, the data buffer control section 25 requests the USB LINK unit 22 to return to the normal power consumption mode. Furthermore, in view of the fact that the input buffer was completely filled with data, the data buffer control section 25 increases the capacity of the input buffer by reassigning part of the memory area allocated to the output buffer to the input buffer.

After the memory area for the input buffer is increased, a data unit 6 is input from the host device 40, resulting in the data units 3 to 6 being accumulated in the input buffer. Then, the data unit 3 is output to the data control section 26 and a data unit 7 is input from the host device 40, resulting in the data units 4 to 7 being accumulated in the input buffer. Thereafter, a data unit 8 is output from the host device 40 and is accumulated in the input buffer. Once the data unit 8, which is the last data unit, is output from the input buffer to the data control section 26, the data buffer control section 25 restores the memory areas allocated to the input and output buffers to the original state before the allocation modification. The CMD data may contain information indicating that the data unit 8 is the last data unit.

Figure 4:
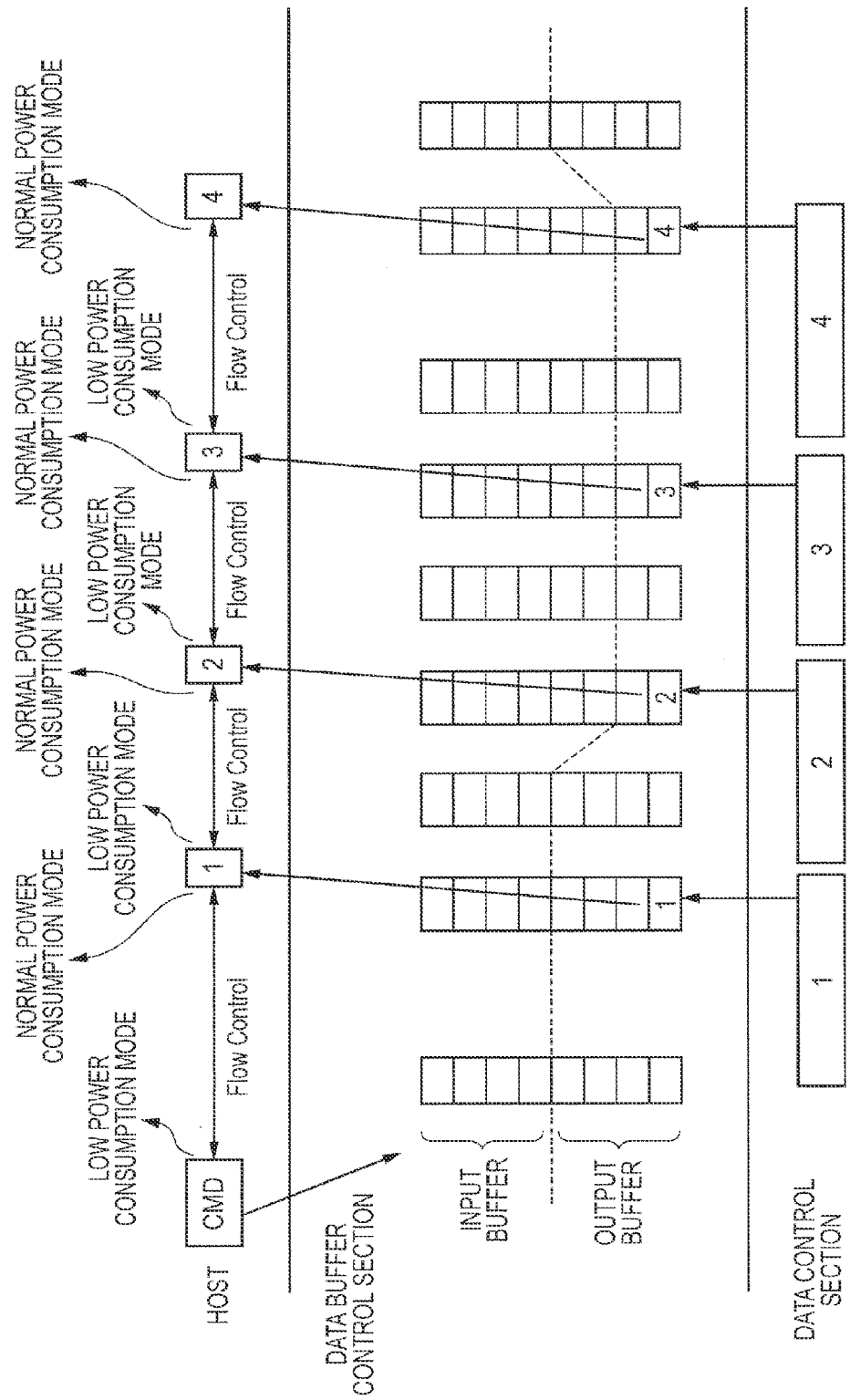
FIG. 4 is a diagram for describing the IN transfer operation of the device controller according to the first embodiment.

Next, the IN transfer operation of the device controller 20 according to the first embodiment of the invention will be described with reference to FIG. 4. First, the endpoint (IN) 24 receives CMD data from the host device, and starts data transfer from the device controller 20 to the host device 40. After the CMD data is received, the USB LINK unit 22 will operate in the low power consumption mode until a data unit 1 is output to the host device 40. Thereafter, the data unit 1 is output from the data control section 26 to the output buffer, resulting in the data unit 1 being accumulated in the output buffer.

Once the data unit 1 is accumulated in the output buffer, the data buffer control section 25 requests the USB LINK unit 22 to return to the normal power consumption mode. When the USB LINK unit 22 returns to the normal power consumption mode, the data unit 1 is output to the host device 40.

After the data unit 1 is output from the output buffer, if no data is left in the output buffer, the data buffer control section 25 requests the USB LINK unit 22 to transition to the low power consumption mode. At this stage, as no data is left in the output buffer, the data buffer control section 25 reassigns part of the memory area allocated to the output buffer to the input buffer.

Then, a data unit 2 is output from the data control section 26 to the output buffer, resulting in the data unit 2 being accumulated in the output buffer.

Once the data unit 2 is accumulated in the output buffer, the data buffer control section 25 requests the USB LINK unit 22 to return to the normal power consumption mode. When the USB LINK unit 22 returns to the normal power consumption mode, the data unit 2 is output to the host device 40. Then, the same procedure is repeated for data units 3 and 4. Once the data unit 4 is output to the host device 40, the data buffer control section 25 restores the memory areas allocated to the input and output buffers to the original state before the allocation modification.

Figure 5:
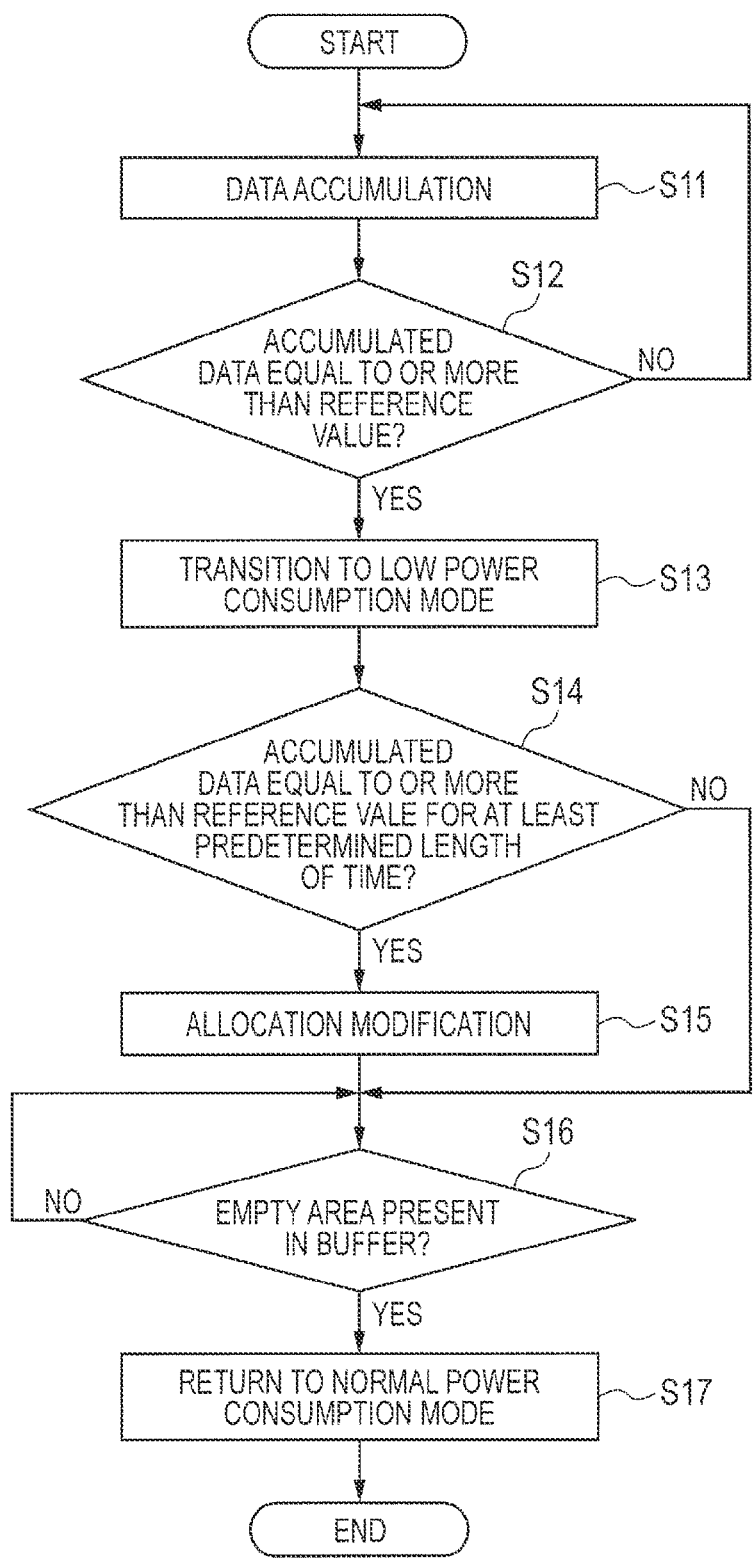
FIG. 5 is a flow diagram for OUT transfer by a data buffer control section according to the first embodiment.

Next, the process flow for the OUT transfer by the data buffer control section 25 according to the first embodiment of the invention will be described with reference to FIG. 5. First, the data buffer control section 25 accumulates data output from the host device 40 in the input buffer (S11).

Then, the data buffer control section 25 determines whether the data amount accumulated in the input buffer is equal to or more than a reference value or not (S12). The reference value may be the maximum data amount that can be accumulated in the input buffer or may be any value less than the maximum data amount. If the data buffer control section 25 determines that the data amount accumulated in the input buffer is not equal to or more than the reference value, Step S11 is repeated to accumulate further data in the input buffer. In contrast, if the data buffer control section 25 determines that the data amount accumulated in the input buffer is equal to or more than the reference value, the data buffer control section 25 requests the USB LINK unit 22 to transition to the low power consumption mode so that the USB LINK unit 22 transitions to the low power consumption mode (S13).

Then, the data buffer control section 25 determines whether the accumulated data amount has been equal to or more than the reference value for at least a predetermined length of time or not (S14). The predetermined length of time may be an accumulated amount of time for which the accumulated data amount is detected to be equal to or more than the reference value within a previously specified period of time, for example. Alternatively, the predetermined length of time may be an amount of time for which the accumulated data amount has been continuously equal to or more than the reference value without interruption.

If the data buffer control section 25 determines that the accumulated data amount has been equal to or more than the reference value for at least the predetermined length of time, the data buffer control section 25 modifies the memory areas allocated to the input and output buffers (S15). Specifically, the data buffer control section 25 reassigns part of the memory area allocated to the output buffer to the input buffer.

Then, the data buffer control section 25 determines whether an empty area has become available in the input buffer or not (S16). Alternatively, the data buffer control section 25 may determine whether the empty area in the input buffer is equal to or more than a predetermined capacity value or not. If the data buffer control section 25 determines that an empty area has become available in the input buffer or that the empty area is equal to or more than the predetermined capacity value, the data buffer control section 25 requests the USB LINK unit 22 to return to the normal power consumption mode so that the USB LINK unit 22 transitions to the normal power consumption mode (S17).

In Step S14, if the data buffer control section 25 determines that the accumulated data amount has not been equal to or more than the reference value for at least the predetermined length of time, Step S16 is performed instead of Step S15. In Step S16, if the data buffer control section 25 determines that no empty area has become available in the input buffer or that the empty area is not equal to or more than the predetermine capacity value, Step S16 is repeated.

In Step S14, rather than determining whether the accumulated data amount has been equal to or more than the reference value for at least the predetermined length of time, the data buffer control section 25 may also modify the memory areas on the basis of the number of times the transition request from the normal power consumption mode to the low power consumption mode or the transition request from the low power consumption mode to the normal power consumption mode is made. For example, the data buffer control section 25 may reassign part of the memory area allocated to the output buffer to the input buffer if the transition request from the normal power consumption mode to the low power consumption mode has been made a previously specified number of times.

Figure 6:
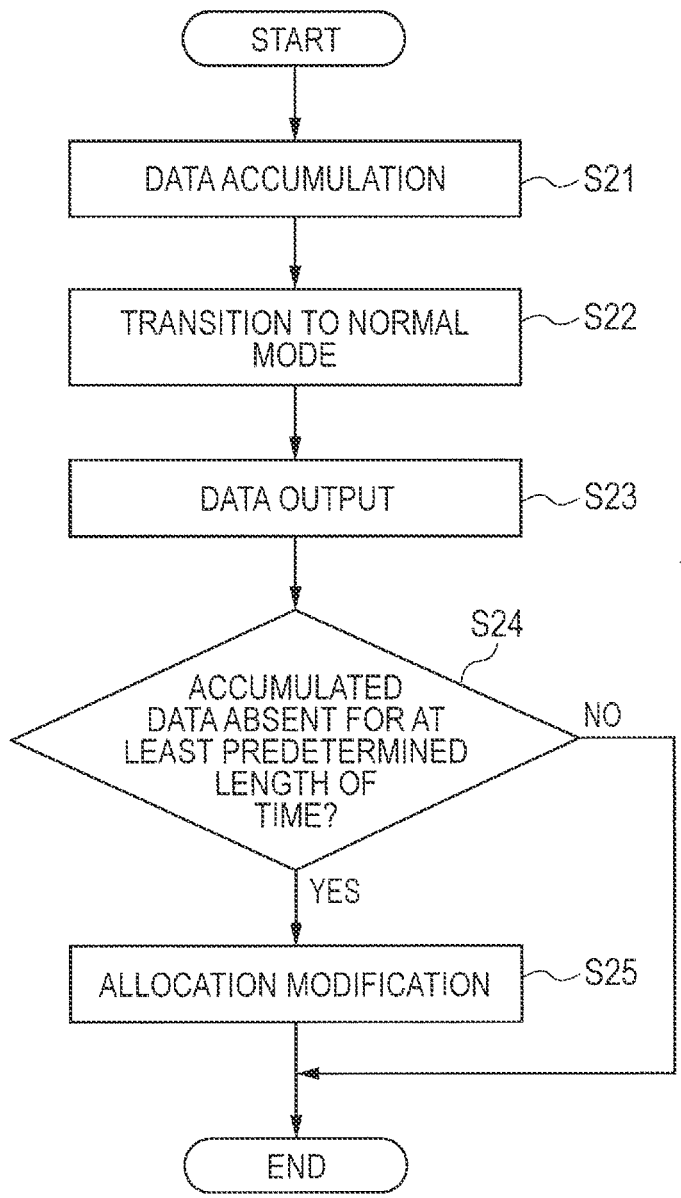
FIG. 6 is a flow diagram for IN transfer by the data buffer control section according to the first embodiment.

Next, the process flow for the IN transfer by the data buffer control section 25 according to the first embodiment of the invention will be described with reference to FIG. 6. First, the data buffer control section 25 receives data from the data control section 26 and accumulates the data in the output buffer (S21). Then, the data buffer control section 25 requests the USB LINK unit 22 to return to the normal power consumption mode so that the USB LIN unit 22 transitions to the normal power consumption mode (S22). Then, the data buffer control section 25 outputs the data accumulated in the output buffer to the host device 40 via the USB LINK unit 22 and the USB PHY unit 21 (S23).

Then, the data buffer control section 25 determines whether accumulated data has been absent in the output buffer for at least a predetermined length of time or not (S24). The predetermined length of time may be an accumulated amount of time for which no accumulated data is detected in the output buffer within a previously specified period of time, for example. Alternatively, the predetermined length of time may be an amount of time for which accumulated data has been absent continuously without interruption.

If the data buffer control section 25 determines that accumulated data has been absent in the output buffer for at least the predetermined length of time, the data buffer control section 25 modifies the memory areas allocated to the input and output buffers (S25). Specifically, the data buffer control section 25 reassigns part of the memory area allocated to the output buffer to the input buffer. If the data buffer control section 25 determines that accumulated data has not been absent for at least the predetermined length of time, the data buffer control section 25 terminates the process without performing Step S25.

As described above, using the device controller 20 according the first embodiment of the invention, it is possible to cause the USB LINK unit 22 to transition from the low power consumption mode to the normal power consumption mode or from the normal power consumption mode to the low power consumption mode on the basis of the data amount accumulated in at least one of the input and output buffers. In this manner, the overall power consumption of the device controller 20 can be reduced by causing the USB LINK unit 22 to transition to the low power consumption mode when no data is output from the host device 40 because no data can be accepted by the input buffer.

Furthermore, the overall power consumption of the device controller 20 can be reduced by causing the USB LINK unit 22 to transition to the low power consumption mode when no data is output from the output buffer to the host device 40 because no data is output from the data control section 26 to the output buffer.

Furthermore, the memory capacities allocated to the input and output buffers can be modified on the basis of the data amount accumulated in at least one of the input and output buffers. For example, when the data amount accumulated in the input buffer increases, it is possible to increase the memory capacity allocated to the input buffer and decrease the memory capacity allocated to the output buffer so that further data output from the host device 40 can be accumulated. In this manner, the data buffer included in the data buffer control section 25 can be used efficiently.

Furthermore, the data buffer control section 25 can perform both the power control for the USB LINK unit 22 and the data buffer capacity control on the basis of the data amount accumulated in at least one of the input and output buffers. As circuitry for performing the power control and the data buffer control need not be provided separately, the circuitry size can also be reduced.

Furthermore, the transfer speed of a bridge chip, such as a Serial ATA interface based on the USB 3.0 standard, may vary significantly depending on the version of the Serial ATA interface supported by a device to be coupled, for example. In view of this problem, the device controller 20 according to the first embodiment of the invention can be used to perform the power control and the buffer control on the basis of the data amount accumulated in the input buffer or the output buffer, thereby achieving control based on the transfer speed.

Second Embodiment

Figure 7:
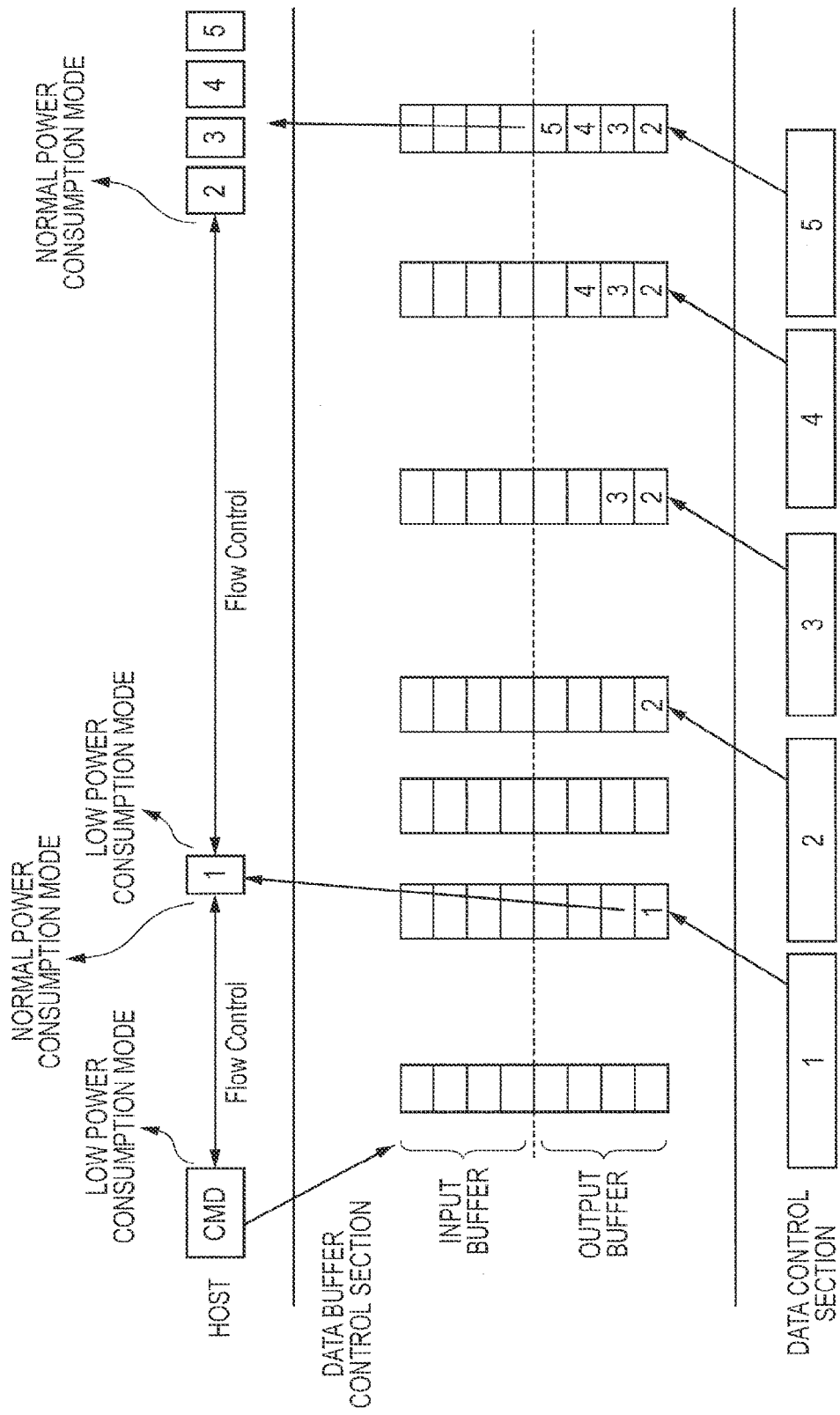
FIG. 7 is a diagram for describing the IN transfer operation of a device controller according to a second embodiment.
Figure 8:
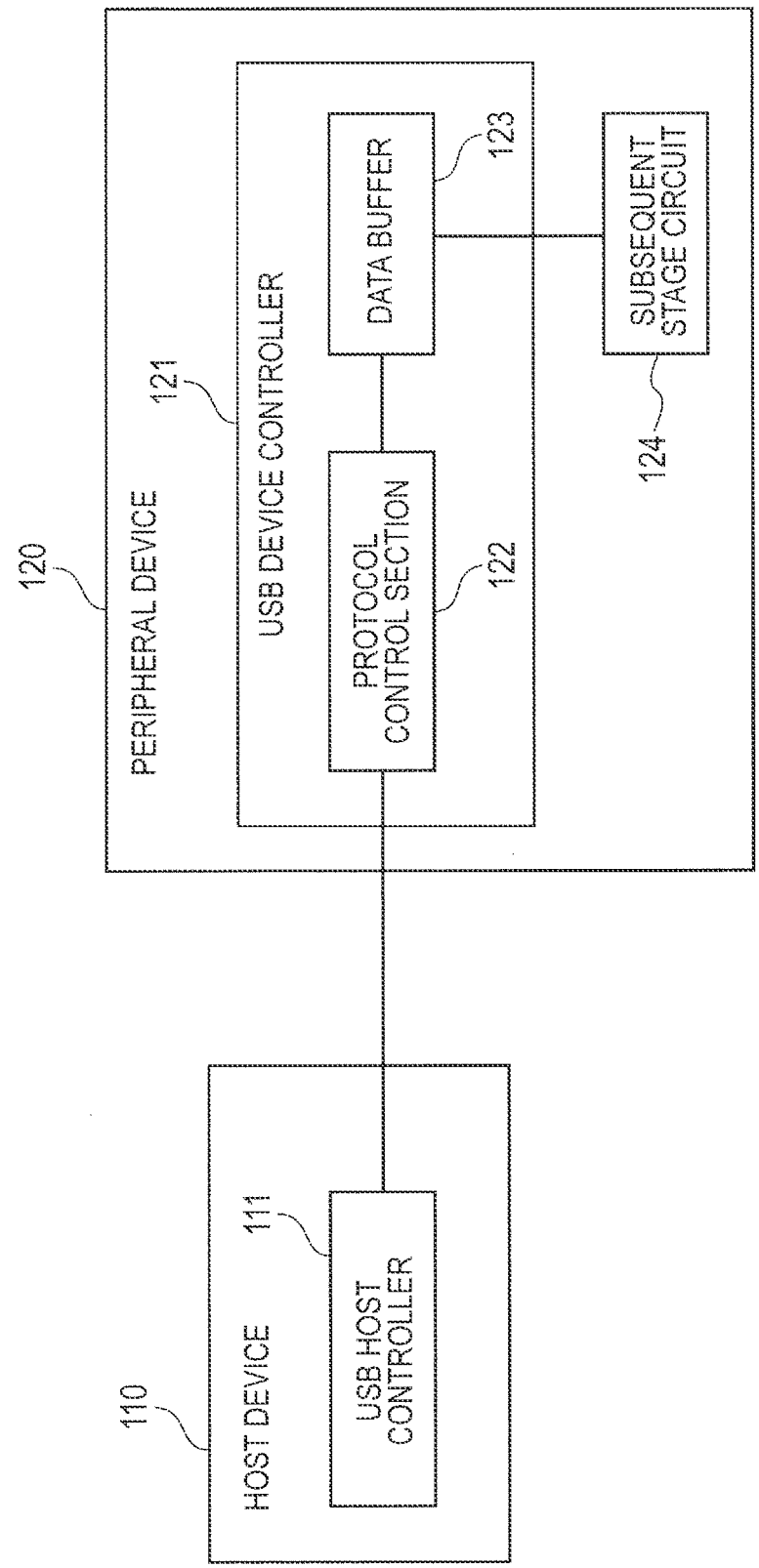
FIG. 8 is a block diagram of a host device and a peripheral device based on the USB 2.0 standard.
Figure 9:
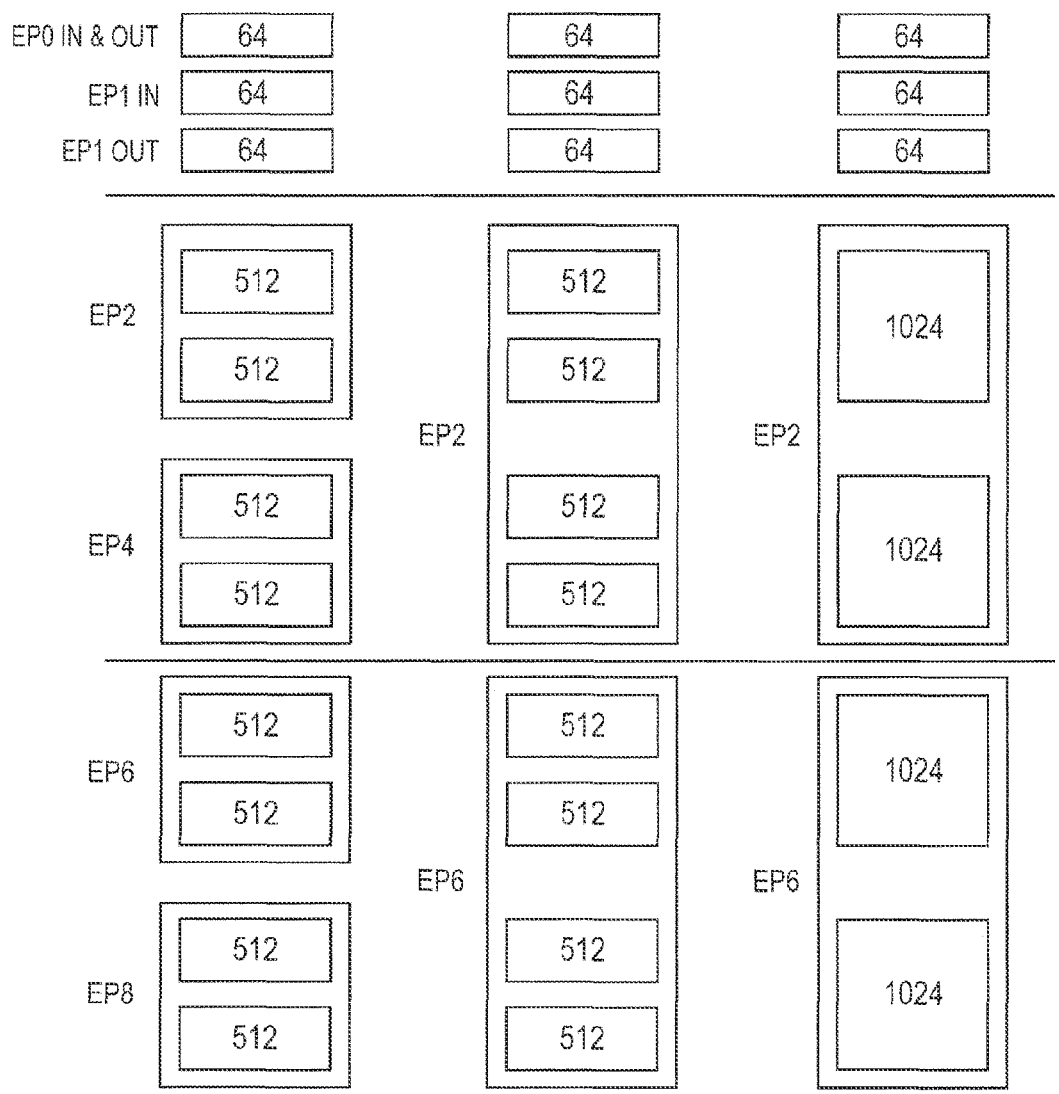
FIG. 9 is a diagram showing typical data buffer allocation in a peripheral device.

Next, the IN transfer operation of the device controller 20 according to a second embodiment of the invention will be described with reference to FIG. 7. First, the endpoint (IN) 24 of the device controller 20 receives CMD data from the host device 40, and starts data transfer from the device controller 20 to the host device 40. After the CMD data is received, the USB LINK unit 22 will operate in the low power consumption mode until a data unit 1 is output to the host device 40. Thereafter, the data unit 1 is output from the data control section 26 to the output buffer, resulting in the data unit 1 being accumulated in the output buffer.

Once the data unit 1 is accumulated in the output buffer, the data buffer control section 25 requests the USB LINK unit 22 to return to the normal power consumption mode. When the USB LINK unit 22 returns to the normal power consumption mode, the data unit 1 is output to the host device 40.

After the data unit 1 is output from the output buffer, if no data is left in the output buffer, the data buffer control section 25 requests the USB LINK unit 22 to transition to the low power consumption mode. Here, in view of the fact that no data is left in the output buffer, the data buffer control section 25 determines that the transfer speed from the data storage section 30 and the data control section 26 to the data buffer control section 25 is low. As a result, the data buffer control section 25 starts to accumulate data in the output buffer until the accumulated data amount reaches a reference data amount value; when the reference data amount value is reached, the data buffer control section 25 transmits the data stored in the output buffer to the host device 40 at a time.

More specifically, assuming that the reference data amount value is 4 (e.g., four packets), the data buffer control section 25 does not output data to the host device 40 when data units 2 to 4 are accumulated in the output buffer. When a data unit 5 is accumulated in the output buffer, thus resulting in the data units 2 to 5 being accumulated in the output buffer, the data buffer control section 25 request the USB LINK unit 22 to return to the normal power consumption mode. The data buffer control section 25 then outputs a batch of the data units 2 to 5 to the host device 40.

As described above, the device controller 20 according to the second embodiment of the invention can be used to output the data accumulated in the output buffer to the host device 40 at a time. In this manner, the data buffer control section 25 can utilize the memory capacity allocated to the output buffer efficiently.

Furthermore, the amount of time for which the USB LINK unit 22 operates in the normal power consumption mode can be reduced because data is accumulated in the output buffer until the data amount reaches the reference data amount value. This enables the overall power consumption of the device controller 20 to be reduced.

The present invention is not limited to the above embodiments, and modifications may be made as appropriate without departing from the spirit of the present invention.

What is claimed is:

1. An Universal Serial Bus (USB) device controller, comprising:

a data link section configured to manage a data link with an USB host;

a buffer control section including an input buffer configured to buffer received data from the USB host, the buffer control section being configured to request a transition to a low power state to the data link section when a data amount stored in the input buffer exceeds a first threshold value.

2. The USB device controller according to claim 1, wherein the buffer control section requests a transition to a normal state to the data link section when the data amount stored in the buffer is less than a second threshold value after the data link section shifts to the low power state.

3. The USB device controller according to claim 1, wherein the data link section in the low power state consumes less power than that in the normal state.

4. A device controller, comprising:

an input buffer configured to accumulate received data output from a host device;

an output buffer configured to accumulate transmission data for the host device;

a data communication section configured to receive the received data from the host device and to transmit the transmission data to the host device; and a buffer control section configured to vary a buffer allocation ratio of the input and the output buffers in response to a data amount accumulated in at least one of the input and the output buffers, wherein the buffer control section causes the data communication section to transition from a normal power consumption mode to a low power consumption mode or from the low power consumption mode to the normal power consumption mode when the data amount reaches a predetermined value.

5. The device controller according to claim 4, wherein the buffer control section causes the data communication section to transition from the normal power consumption mode to the low power consumption mode when the data amount accumulated in the input buffer exceeds a first reference value.

6. The device controller according to claim 5, wherein the data communication section outputs a data output suspension signal to the host device for suspension of data output when the data amount accumulated in the input buffer exceeds the first reference value.

7. The device controller according to claim 5, wherein the buffer control section causes the data communication section to transition from the low power consumption mode to the normal power consumption mode when the data amount accumulated in the input buffer falls below a second reference value that is equal to or less than the first reference value.

8. The device controller according to claim 7, wherein the data communication section outputs a data output commencement signal to the host device for commencement of data output when the data amount accumulated in the input buffer falls below the second reference value.

9. The device controller according to claim 4, wherein the buffer control section causes the data communication section to transition from the normal power consumption mode to the low power consumption mode when the data amount accumulated in the output buffer falls below a third reference value.

10. The device controller according to claim 9, wherein the data communication section does not output the accumulated data to the host device when the accumulated data amount falls below the third reference value.

11. The device controller according to claim 9, wherein the buffer control section causes the data communication section to transition from the low power consumption mode to the normal power consumption mode when the data amount accumulated in the output buffer exceeds a fourth reference value that is equal to or more than the third reference value.

12. The device controller of claim 11, wherein the buffer control section reassigns part of a memory area allocated to the output buffer to the input buffer when the data amount accumulated in the input buffer exceeds a fifth reference value or when the data amount accumulated in the output buffer falls below a sixth reference value.

13. The device controller according to claim 12, wherein the buffer control section reassigns the part of the memory area allocated to the output buffer to the input buffer when the data amount accumulated in the input buffer exceeds the fifth reference value for at least a predetermined length of time or when the data amount accumulated in the output buffer falls below the sixth reference value for at least a predetermined length of time.

14. The device controller according to claim 11, wherein the buffer control section modifies an area on a shared memory allocated to the input buffer and an area on the shared memory allocated to the output buffer based on a number of times the data communication section transitions from the normal power consumption mode to the low power consumption mode.

15. The device controller according to claim 11, wherein the buffer control section restores the modified areas allocated to the input and output buffers to the areas originally allocated to the input and output buffers before the modification when all the data accumulated in the input and output buffers are transferred.

16. The device controller according to claim 4, wherein the host device includes a USB host controller, and the data communication section transfers data between the input and output buffers and the USB host controller.

17. The device controller according to claim 16, wherein the buffer control section performs Low Power State control in which the data communication section transitions from the normal power consumption mode to the low power consumption mode based on the data amount accumulated in at least one of the input and output buffers.

18. A power control method, comprising:

causing a data communication section for transferring data between input and output buffers and a host device to transition from a normal power consumption mode to a low power consumption mode based on a data amount accumulated in at least one of the input and output buffers, the input buffer accumulating data output from the host device and the output buffer accumulating data output to the host device; and after the data communication section transitions to the low power consumption unit, modifying memory capacity allocation amounts to the input and output buffers based on the data amount accumulated in at least one of the input and output buffers.

19. The power control method according to claim 18, wherein the data communication section transitions from the normal power consumption mode to the low power consumption mode when the data amount accumulated in the input buffer exceeds a first reference value.

20. The power control method according to claim 19, wherein before the data communication section transitions from the normal power consumption mode to the low power consumption mode, the data communication section outputs a data output suspension signal to the host device for suspension of data output.

21. The power control method according to claim 19, wherein after the data communication section transitions from the normal power consumption mode to the low power consumption mode, the data communication section transitions from the low power consumption mode to the normal power consumption mode when the data amount accumulated in the input buffer falls below a second reference value that is equal to or less than the first reference value.

* * * * *